US012246445B2

(12) United States Patent
Chen et al.

(10) Patent No.: US 12,246,445 B2
(45) Date of Patent: Mar. 11, 2025

(54) MECHANICAL ARM JOINT

(71) Applicants: AGILE ROBOTS SE, Munich (DE); Beijing Siling Robot Technology Co., Ltd., Beijing (CN)

(72) Inventors: Zhaopeng Chen, Beijing (CN); Xuebin Su, Beijing (CN); Yuechao Zaho, Beijing (CN); Qian Wang, Beijing (CN); Georg Stillfried, Munich (DE)

(73) Assignees: Agile Robots SE, Munich (DE); Beijing Siling Robot Technology Co., Ltd., Beijing (CN)

( * ) Notice: Subject to any disclaimer, the term of this patent is extended or adjusted under 35 U.S.C. 154(b) by 0 days.

(21) Appl. No.: 17/780,606

(22) PCT Filed: Nov. 17, 2020

(86) PCT No.: PCT/EP2020/082431
§ 371 (c)(1),
(2) Date: May 27, 2022

(87) PCT Pub. No.: WO2021/104948
PCT Pub. Date: Jun. 3, 2021

(65) Prior Publication Data
US 2023/0356416 A1 Nov. 9, 2023

(51) Int. Cl.
*B25J 9/10* (2006.01)
*B25J 13/08* (2006.01)
*B25J 17/00* (2006.01)

(52) U.S. Cl.
CPC ........... *B25J 9/1025* (2013.01); *B25J 13/085* (2013.01); *B25J 17/00* (2013.01)

(58) Field of Classification Search
CPC ........ B25J 9/1025; B25J 13/085; B25J 17/00; B25J 19/0004; B25J 19/027; F16H 49/001
See application file for complete search history.

(56) References Cited

U.S. PATENT DOCUMENTS 5,155,423 A * 10/1992 Karlen ............... B25J 9/046
                                                318/568.1
2018/0172080 A1 * 6/2018 Jackowski ........... F16H 49/001
2018/0215050 A1   8/2018 Kassow

FOREIGN PATENT DOCUMENTS

CN    101913151 A    12/2010
CN    109366480 A     2/2019
(Continued)

OTHER PUBLICATIONS

What is cross roller bearing, and how are they classified?. Yogie Machinery. (Apr. 19, 2019). https://www.yogiemachinery.com/info/what-is-cross-roller-bearing-and-how-many-clas-33982790.html (Year: 2019).*

(Continued)

*Primary Examiner* — Joseph Brown
(74) *Attorney, Agent, or Firm* — Carter, DeLuca & Farrell LLP

(57) ABSTRACT

The invention relates to a mechanical arm joint which comprises a hollow shaft and a brake assembly, a motor assembly, a harmonic reducer assembly, an output assembly, a housing assembly, and a measurement assembly which are disposed outside the hollow shaft, the measurement assembly includes a torque sensor, and the torque sensor is provided inside the housing assembly and fixed to the housing assembly, the torque sensor is fixed to the harmonic reducer assembly at the same time. The torque sensor is provided in the joint, so as to ensure that the torque sensor is not damaged by external impacts during assembling and maintaining of the joint and the mechanical arm. The power cables and signal cables are connected to the circuit board at the right end of the joint from the side of the joint instead of through the joint center hole, so that the torque sensor cable and other cables in the joint are arranged separately, therefore the signal of the torque sensor does not interfere with (Continued)

the signal in other cables, and it is beneficial to the torque sensor signal transmission due to the length of cable is shorter, and the joint structure is more compact because of the diameter of joint center hole becomes smaller due to the number of the cables passed through the joint center hole decreases.

9 Claims, 1 Drawing Sheet

(56) References Cited

FOREIGN PATENT DOCUMENTS

| CN | 110171016 A | | 8/2019 |
|---|---|---|---|
| EP | 1503196 A1 | | 2/2005 |
| KR | 20060985740 | | 2/2013 |
| KR | 101793141 B1 | * | 11/2017 |
| WO | 2010142318 A1 | | 12/2010 |

OTHER PUBLICATIONS

WO 2010142318 A1 (Torgny Grogaardh) Dec. 16, 2010 (full text). [online] [retrieved on Mar. 20, 2024]. Retrieved from: Clarivate Analytics. (Year: 2010).*

Chinese Officie Action for application No. 201911208252.2 dated Sep. 24, 2020 with English Translation.

International Search Report for application No. PCT/EP2020/082431 dataed Jun. 3, 2021.

Written Opinion for application No. PCT/EP2020/082431 dated Jun. 3, 2021.

KR520210384247 Notice for Grounds for Rejection, dated Mar. 18, 2024, 13pp.

* cited by examiner

MECHANICAL ARM JOINT

FIELD OF THE INVENTION

The invention relates to the field of mechanical arm, in particular to a mechanical arm joint.

BACKGROUND OF THE INVENTION

In the prior art, a torque sensor is arranged on an output side of a joint generally, such as Chinese patent CN207548790U which discloses a driving device and a robot, and Chinese application CN109715348A which discloses a driving unit of a manipulator. As a high-precision assembly, the torque sensor is extremely sensitive to impacts, and thus when the torque sensor is exposed on the joint, the torque sensor is easy to be damaged during assembling and maintaining; and the power cables and signal cables of the torque sensor are connected to the circuit board on the right end of the joint through the joint center hole; the torque sensor cables need to pass through the joint center hole, therefore the joint center hole must be large; and further, long cables are not beneficial to signal transmission and the signal transmitted in the long cables will interfere with signals in other cables in the joint central hole.

SUMMARY OF THE INVENTION

It is an object of the invention to solve the problem of the prior art and provide a mechanical arm joint with a torque sensor placed inside the mechanical arm joint to ensure that the torque sensor is not damaged by external impacts during assembling and maintaining of the joint and the mechanical arm. The power cables and signal cables are connected to the circuit board at the right end of the joint from the side of the joint instead of through the joint center hole, so that the torque sensor cable and other cables in the joint are arranged separately, therefore the signal of the torque sensor does not interfere with the signal in other cables, and it is beneficial to the torque sensor signal transmission due to the length of cable is shorter, and the joint structure is more compact because of the diameter of joint center hole becomes smaller due to the number of the cables passed through the joint center hole decreases.

The technical solution of the invention is: A mechanical arm joint, comprising a hollow shaft and a brake assembly, a motor assembly, a harmonic reducer assembly, an output assembly, a housing assembly, and a measurement assembly which are disposed outside the hollow shaft, and the measurement assembly includes a torque sensor, and the torque sensor is provided inside the housing assembly and fixed to the housing assembly, the torque sensor is fixed to the harmonic reducer assembly at the same time.

Further, the motor assembly includes a motor housing, a motor shaft, an input shaft, a motor stator, and a motor rotor, the motor stator is fixed to the motor housing, the motor rotor is fixed to the motor shaft, and the motor shaft is fixed to the input shaft.

Further, the output assembly comprises an output flange, an output end housing, and a roller bearing, and the roller bearing is disposed between the output flange and the output end housing.

Further, the roller bearing is a cross roller bearing.

Further, the harmonic reducer assembly comprises a wave generator, a flexible wheel, and a rigid wheel.

Further, the wave generator is fixed to an input shaft of the motor assembly, the flexible wheel is fixed to the torque sensor, and the rigid wheel is fixed to an output flange of the output assembly.

Further, the flexible wheel is fixed to the torque sensor through a flexible wheel mounting plate.

Further, a friction structure member is provided between the flexible wheel mounting plate and the torque sensor.

Further, the measuring assembly further includes a high-speed side encoder and a low-speed side encoder, the high-speed side encoder is used to measure the speed of the motor, and the low-speed side encoder is used to measure the position of the output flange.

Further, the high-speed side encoder includes a high-speed side reading head and a high-speed side magnetic ring, the position of the high-speed side reading head is constant in relation to the housing assembly, and the high-speed side magnetic ring moves synchronously with the motor shaft.

Further, the high-speed side encoder further includes a high-speed side reading head bracket, the high-speed side reading head bracket is fixed to the housing assembly, the high-speed side reading head bracket is fixed to the high-speed side reading head.

Further, the low-speed side encoder includes a low-speed side reading head and a low-speed side magnetic ring, the position of the low-speed side reading head is constant in relation to the housing assembly, the position of the output flange of the output assembly is constant in relation to the hollow shaft and the low-speed side magnetic ring, the output flange of the output assembly can drive the hollow shaft and the low-speed side magnetic ring to move synchronously.

Further, the low-speed side encoder further includes a low-speed side reading head bracket and a hoop, the low-speed side magnetic ring and the hoop are fixed to the low-speed side reading head bracket respectively; and the hoop is fixed to the hollow shaft.

The invention has the following beneficial effects:
(1) The torque sensor is provided in the joint, so as to ensure that the torque sensor is not damaged by external impacts during debugging or maintaining the joint or the mechanical arm, and further, when the joint is impacted, the torque sensor can accurately detect the changes of the joint torque caused by the changes of external forces, that is, the accuracy of joint torque measurement is improved while ensuring the safety of the torque sensor.
(2) The power cables and signal cables are connected to the circuit board at the right end of the joint from the outside of the joint instead of through the joint center hole, so that the torque sensor cable and other cables in the joint are arranged separately, therefore the signal of the torque sensor does not interfere with the signal in other cables.
(3) The motor is a frameless motor, which is glued to the motor casing and the motor shaft through glue, so the motor has a compact structure.
(4) The high-speed side encoder and low-speed side encoder are installed on the motor side and the output flange side, respectively, and measure the speed of the motor and the position of the output flange, respectively, so the joint is controlled flexibly and accurately.
(5) A brake is installed on the motor side of the joint, which keeps the joint in its current position after power failure, and provides braking during emergency stop, so the joint is safe and reliable.

Figure 1:
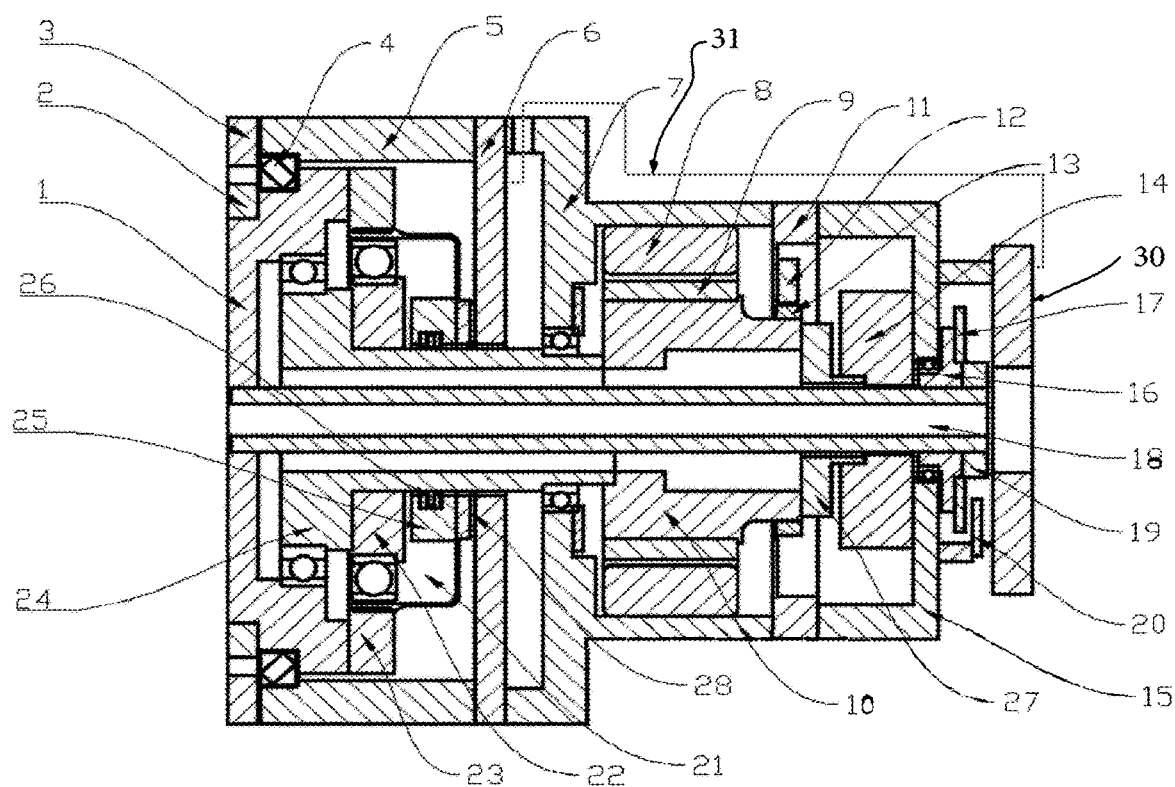
FIG. 1 is a sectional view of a mechanical arm joint.

wherein, the above drawing includes the following reference signs: 1—output flange; 2—bearing inner ring pressing plate; 3—bearing outer ring pressing plate; 4—cross roller bearing; 5—output end housing; 6—torque sensor; 7—motor housing; 8—motor stator; 9—motor rotor; 10—motor shaft; 11—high-speed side reading head bracket; 12—high-speed side reading head; 13—high-speed side magnetic ring; 14—brake; 15—brake housing; 16—low-speed side reading head bracket; 17—low-speed side magnetic ring; 18—hollow shaft; 19—hoop; 20—low-speed side reading head; 21—flexible wheel; 22—wave generator; 23—rigid wheel; 24—input shaft; 25—flexible wheel mounting plate; 26—seal ring; 27—rotor hub; 28—friction structure member.

DETAILED DESCRIPTION OF THE PREFERRED EMBODIMENTS

The technical solution of the present invention will be clearly and completely described below with reference to the accompanying drawings. Obviously, the described embodiments are part of the present invention, but not all of them. Based on the embodiments of the present invention, all other embodiments obtained by the one skilled in the art without creative efforts shall fall within the protection scope of the present invention.

In the description of the present invention, it should be noted that the terms like "center", "up", "down", "left", "right", "vertical", "horizontal", "inside", "outside", and the like which indicate orientation or positional relationship indicate the orientation or 5 positional relationship shown in the drawings, and the above-mentioned terms are used only to facilitate the description of the invention and to simplify the description instead of indicating or implying that the device or element referred to must have a specific orientation, and be constructed and operated in a specific orientation, and therefore it cannot be understood as a limitation on the invention. In addition, the terms like "first," "second," and "third" are used for descriptive purposes only, and should not be construed to indicate or imply relative importance.

In the description of the present invention, it should be noted that the terms like "installation", "connect", and "concatenate" should be construed in a broad way unless the meanings of above-mentioned terms are clear, for example, the above-mentioned terms can be a fixed connection, or a detachable connection, or an integral connection, or a mechanical connection, or an electrical connection, or a direct connection, or indirect connection which is achieved by an intermediate medium, or an internal connection of two components. For the one skilled in the art, the specific meanings of the above terms in the present invention can be understood in accordance with specific conditions.

A mechanical arm joint includes a hollow shaft 18 and a brake assembly, a motor assembly, a harmonic reducer assembly, an output assembly, a housing assembly, and a measurement assembly. The brake assembly, motor assembly, harmonic reducer assembly, output assembly, housing assembly, and measurement assembly are disposed outside the hollow shaft 18. The measurement assembly includes a torque sensor 6, and the torque sensor 6 is provided inside the housing assembly and fixed to the housing assembly, the torque sensor 6 is fixed to the harmonic reducer assembly at the same time, preferably by screw.

The housing assembly includes an output end housing 5, a motor housing 7, and a brake housing 15. The positions of the output end housing 5, the motor housing 7, and the brake housing 15 are fixed relative to the others. It can be understood that the housing assembly have various structural forms and connection forms. The housing assembly can be divided into several parts along the axial direction, the cross-sections of the several parts contacts and are fixed together by screws, or the several parts connected together by circumferential nesting. Or, the housing assembly can be divided into several parts along the circumferential direction, and then the several parts are fixed together. The other assembly (brake assembly, a motor assembly, a harmonic reducer assembly, an output assembly, and a measurement assembly) are arranged in the housing assembly through fixed connection or bearing support.

The motor assembly includes the motor housing 7, a motor shaft 10, an input shaft 24, a motor stator 8; and a motor rotor 9, the motor stator 8 is fixed to the motor housing 7, the motor rotor 9 is fixed to the motor shaft 10, preferably by gluing. And the motor shaft 10 is fixed to the input shaft 24, preferably by screw. Both ends of the motor shaft 10 and the input shaft 24 are supported in the housing assembly through bearings. In this embodiment, the motor is a frameless motor, so the motor has a compact structure due to the motor is glued to the motor housing 7 and the motor shaft 10.

The output assembly includes an output flange 1, the output end housing 5, and a cross roller bearing 4. The cross roller bearing 4 is provided between the output flange 1 and the output end housing 5. The output flange 1 is supported by the cross roller bearing 4 so that the output flange 1 can withstand forces in all directions.

The output flange 1 of the output assembly is fixed to one end of the hollow shaft 18, preferably by gluing, the other end of the hollow shaft 18 is supported in the brake housing 15 through a bearing.

Further, the output assembly further includes a bearing inner ring pressing plate 2 and a bearing outer ring pressing plate 3, the output flange 1 is fixed to the bearing inner ring pressing plate 2, the bearing outer ring pressing plate 3 is fixed to the output end housing 5, preferably by screw; and the inner ring of the cross roller bearing 4 is pressed against the bearing inner ring pressing plate 2 tightly by pressure therebetween, the outer ring of the cross roller bearing 4 is pressed against the bearing outer ring pressing plate 3 tightly by pressure therebetween.

The harmonic reducer assembly includes a wave generator 22, a flexible wheel 21 and a rigid wheel 23.

The wave generator 22 is fixed to the input shaft 24 of the motor assembly. The input shaft 24 passes through the central circular hole of the flexible wheel 21, the flexible wheel 21 is fixed to the torque sensor 6, and the rigid wheel 23 is fixed to the output flange 1 of the output assembly, that is, the torque is input by the wave generator 22, the torque is output by the rigid wheel 23, so that the torque is increased by decreasing the speed. The torque sensor 6 measures torque forced on the joint by detecting the torque forced on the flexible wheel 21.

Further, the flexible wheel 21 is fixed to the torque sensor 6 through a flexible wheel mounting plate 25. A seal ring 26 is provided between the flexible wheel mounting plate 25 and the input shaft 24. A friction structure member 28 is provided between the flexible wheel 21 and the torque sensor 6, and the mating surface of the flexible wheel 21 and the mating surface of the torque sensor 6 are simultaneously pressed against the friction structure member 28 tightly by pressure therebetween.

The joint motor is provided on the side of flexible wheel 21 of the harmonic reducer assembly, the motor shaft is connected to the input shaft 24, and the input shaft 24 passes through the central circular hole of the flexible wheel 21 and connects to the wave generator 22. And the flexible wheel 21 is fixed to the motor housing 7, the rigid wheel 23 of the harmonic reducer assembly is used as an output.

The torque sensor 6 is provided in the joint to ensure that the torque sensor is not damaged by external impacts during assembling and maintaining of the joint and the mechanical arm; and further, the power cables and signal cables 31 are connected to the circuit board 30 at the right end of the joint from the side of the joint instead of through the center hole of the joint, so that the torque sensor cable and other cables in the joint are arranged separately, therefore the signal of the torque sensor does not interfere with the signal in other cables, and it is conducive to the torque sensor signal transmission due to the length of cable is shorter, and the joint structure is more compact because of the diameter of joint center hole becomes smaller due to the number of the cables passed through the joint center hole decreases.

The power cable and signal cable 31 of the torque sensor 6 are connected to the circuit board 30 at the right end of the joint from outside the joint so that the center hole is not occupied by the power cable and signal cable 31 of the torque sensor 6, and the power cable and signal cable 31 of the torque sensor 6 and other power cables and signal cables 31 in the joint are arranged separately so that the signal of the torque sensor does not interfere with the signal in other cables each other.

In this embodiment, the torque sensor 6 is connected to the output end housing 5 and the motor housing 7 by screw. It can be understood that the torque sensor 6 is connected to the housing assembly in various ways, for example, the torque sensor 6 is separately fixed to the output end housing 5 or the motor housing. 7. The torque sensor is fixed on the motor housing 7, so the torque sensor will not rotate in relation to the motor housing during operation.

The brake assembly includes a brake 14, a brake housing 15, and a rotor hub 27. The brake 14 is fixed to the brake housing 15, preferably by screw. The rotor hub 27 is fixed to the motor shaft 10. The shape of the rotor hub 27 is square, and the rotor hub is matched with the square hole in the center of the brake to achieve the braking function. The brake assembly keeps the joint in the current position after power off, and provides braking during emergency stop, so the joint is safe and reliable.

Further, the measuring assembly further includes a high-speed side encoder and a low-speed side encoder. The high-speed side encoder is used to measure the speed of the motor, that is, the speed of the joint, and the low-speed side encoder is used to measure the position of the output flange, that is, the position of the joint.

The high-speed side encoder includes a high-speed side reading head 12 and a high-speed side magnetic ring 13. The position of the high-speed side reading head 12 is constant in relation to the housing assembly, and the high-speed side magnetic ring 13 moves synchronously with the motor shaft 10. The motor shaft 10 drives the high-speed side magnetic ring 13 to rotate, and the high-speed side reading head 12 reads the high-speed side magnetic ring 13 to obtain the speed of the motor.

Further, the high-speed side encoder further includes a high-speed side reading head bracket 11, the high-speed side reading head bracket 11 is fixed to the high-speed side reading head 12, and the high-speed side reading head bracket 11 is fixed to the motor housing 7 and/or the brake housing 15, preferably by screw.

The low-speed side encoder includes a low-speed side reading head 20 and a low-speed side magnetic ring 17. The position of the low-speed side reading head 20 is constant in relation to the housing assembly, the output flange 1 of the output assembly can drive the hollow shaft 18 and the low-speed side magnetic ring 17 to move synchronously. The low-speed side reading head 20 reads the low-speed side magnetic ring 17 to obtain the position of the output flange 1, that is, the position of the joint.

The low-speed side reading head 20 is fixed to the brake housing 15, preferably by screw.

Further, the low-speed side encoder further includes a low-speed side reading head bracket 16 and a hoop 19, the low-speed side magnetic ring 17 and the hoop 19 are fixed to the low-speed side reading head bracket 16 respectively; and the hoop 19 is fixed to the hollow shaft, preferably by screw, and a bearing is provided between the low-speed side reading head bracket 16 and the brake housing 15.

After the joint is power on, the brake 14 is opened, and the motor rotor 9 rotates under the electromagnetic action. The motor rotor 9 drives the motor shaft 10, the input shaft 24 which passes through the center hole of the flexible wheel 21 and the wave generator 22 to rotate, and a harmonic reducer assembly comprises the flexible wheel 21, The wave generator 22 and the rigid wheel 23, the input shaft 24 drives the wave generator 22 to rotate as an input, and the flexible wheel 21 is fixed, the rigid wheel 23 drives output flange 1 to rotate as an output, so the torque is increased and the speed is reduced. the torque sensor 6 does not rotate in relation to the motor housing 7 during this process.

The output flange 1 can withstand forces in various directions under the support of the cross roller bearing 4.

The torque sensor 6 measures torque forced on the output flange 1, that is, the torque forced on the flexible wheel 21, by detecting the torque forced on the flexible wheel 21.

The high-speed side encoder comprises the high-speed side reading head 12 and the high-speed side magnetic ring 13, the motor shaft 10 drives the high-speed side magnetic ring 13 to rotate. The high-speed side reading head 12 reads the high-speed side magnetic ring 13 to obtain the speed of the motor.

The low-speed side encoder comprises the low-speed side reading head 20 and the low-speed side magnetic ring 17, The output flange 1 drives the hollow shaft 18 and the low-speed side magnetic ring 17 to rotate, the low-speed side reading head 20 reads the low-speed side magnetic ring 17 to obtain the position of the output flange 1, that is, the position of the joint.

The above embodiment is a preferred embodiment of the present invention, but the embodiment of the present invention is not limited by the above embodiment. Any other changes, modifications, substitutions, combinations, simplification and modifications made without departing from the spirit and principle of the present invention, all should be equivalent replacement methods, and all are included in the protection scope of the present invention.

What is claimed is:
1. A mechanical arm joint, comprising:
a hollow shaft and a brake assembly, a motor assembly, a harmonic reducer assembly, an output assembly, a housing assembly, and a measurement assembly which are disposed outside the hollow shaft, the motor assembly including a motor shaft and an input shaft, the motor shaft fixed to the input shaft, the motor shaft and the input shaft supported in the housing assembly via one or more bearings, the brake assembly including a brake, a brake housing, and a rotor hub, the brake being fixed to the brake housing and the rotor hub being fixed to the motor shaft, the output assembly including an output flange fixed to one end of the hollow shaft, another end of the hollow shaft being supported in the brake housing via one or more second bearings, wherein the measurement assembly includes a torque sensor, the torque sensor provided inside the housing assembly and fixed to the housing assembly, the torque sensor being fixed to the harmonic reducer assembly;

the harmonic reducer assembly including a wave generator, a flexible wheel, and a rigid wheel, the flexible wheel being fixed to the torque sensor through a flexible wheel mounting plate, wherein the torque sensor is connected to a circuit board via a power cable and a signal cable; and a friction structure member disposed between the flexible wheel mounting plate and the torque sensor such that a mating surface of the flexible wheel and a mating surface of the torque sensor simultaneously press against the friction structure member via pressure therebetween.

2. The mechanical arm joint of claim 1, wherein the motor assembly includes a motor housing, the motor shaft, the input shaft, a motor stator, and a motor rotor, the motor stator being fixed to the motor housing, the motor rotor being fixed to the motor shaft, and the motor shaft being fixed to the input shaft.

3. The mechanical arm joint of claim 1, wherein the one or more second bearings is a roller bearing.

4. The mechanical arm joint of claim 1, wherein the wave generator is fixed to the input shaft of the motor assembly, the flexible wheel is fixed to the torque sensor, and the rigid wheel is fixed to the output flange of the output assembly.

5. The mechanical arm joint of claim 1, wherein the measuring assembly further includes a high-speed side encoder and a low-speed side encoder, the high-speed side encoder is configured to measure a speed of the motor, and the low-speed side encoder is configured to measure a position of the output flange.

6. The mechanical arm joint of claim 5, wherein the high-speed side encoder includes a high-speed side reading head and a high-speed side magnetic ring, and wherein the position of the high-speed side reading head remains constant in relation to the housing assembly, and wherein the high-speed side magnetic ring moves synchronously with the motor shaft.

7. The mechanical arm joint of claim 6, wherein the high-speed side encoder further includes a high-speed side reading head bracket fixed to the housing assembly, and wherein the high-speed side reading head bracket is fixed to the high-speed side reading head.

8. The mechanical arm joint of claim 5, wherein the low-speed side encoder includes a low-speed side reading head and a low-speed side magnetic ring, and wherein the position of the low-speed side reading head remains constant in relation to the housing assembly, and wherein the position of the output flange of the output assembly remains constant in relation to the hollow shaft and the low-speed side magnetic ring, and wherein the output flange of the output assembly is configured to drive the hollow shaft and the low-speed side magnetic ring to move synchronously.

9. The mechanical arm joint of claim 8, wherein the low-speed side encoder further includes a low-speed side reading head bracket and a hoop, and wherein the low-speed side magnetic ring and the hoop are fixed to the low-speed side reading head bracket respectively, and wherein the hoop is fixed to the hollow shaft.

* * * * *